April 18, 1950        F. M. FORD        2,504,259
MOWER
Filed July 15, 1947
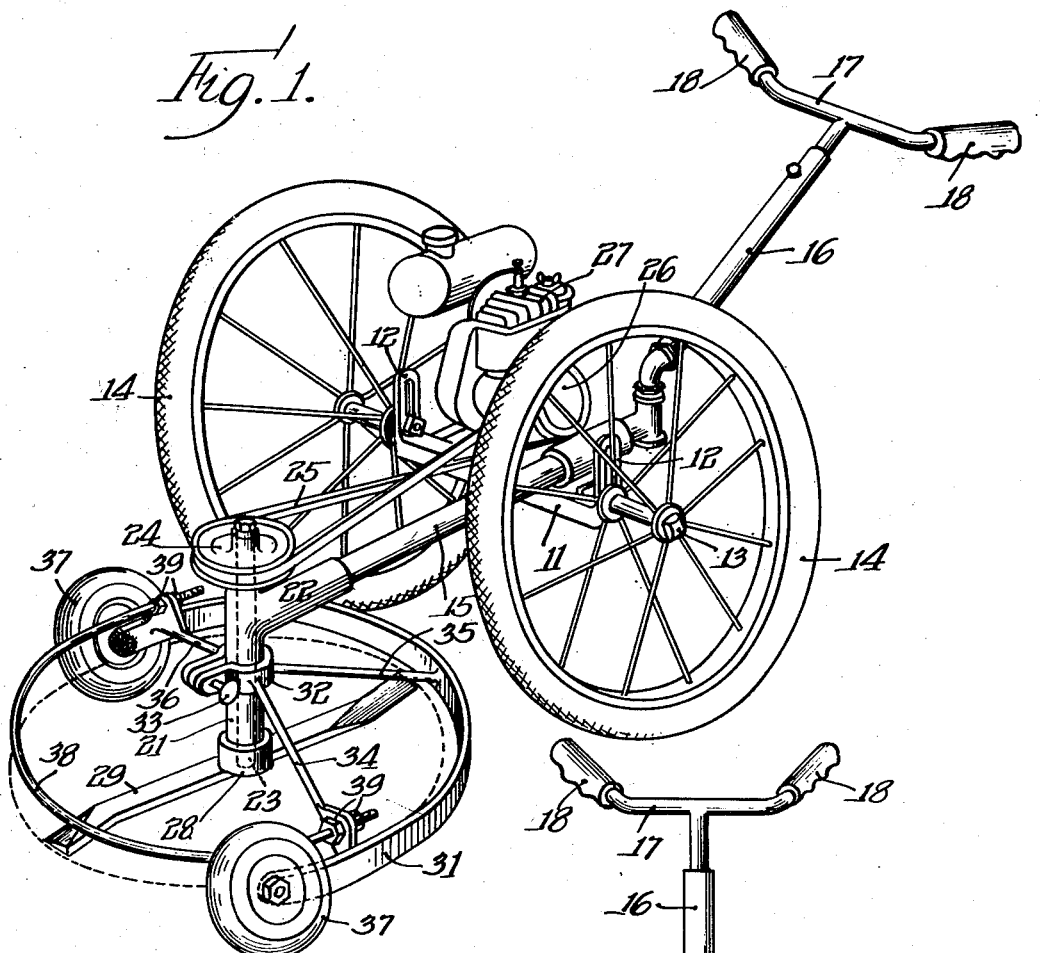
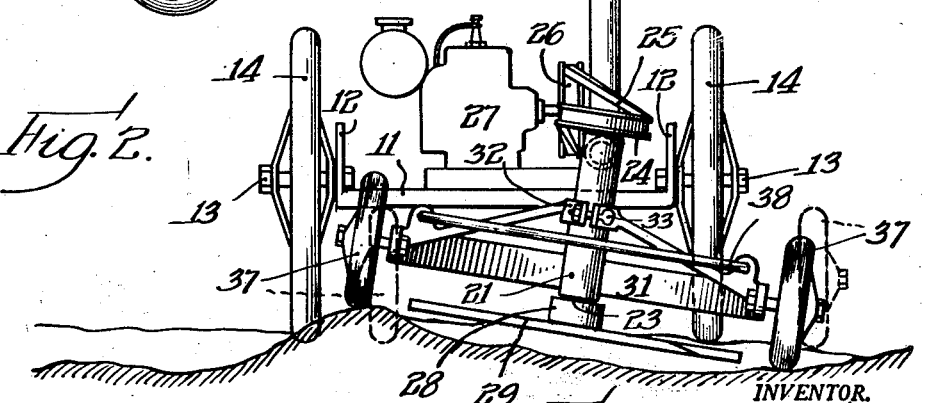
INVENTOR.
Foster M. Ford
By: Walter M. Fuller
atty.

Patented Apr. 18, 1950

2,504,259

UNITED STATES PATENT OFFICE 2,504,259

MOWER

Foster M. Ford, Morris, Ill.

Application July 15, 1947, Serial No. 761,130

5 Claims. (Cl. 56—25.4)

The present invention which relates to certain innovatory structural benefits and resulting functional advantages in vegetation mowers, such as those employed for cutting grass and other growing plants, concerns more particularly distinct advantages and refinements in the means incorporated in such appliances for performing their required work, and more particularly in mowing the plant life on terrains of varying surface slopes and angles.

An outstanding and paramount aim or object of this invention is to provide equipment of that type capable of satisfactorily performing the mowing operation under the conditions specified which is relatively simple in structure, which is comparatively economical to make, which is especially efficient in service, which is easy to operate, which is unlikely to become damaged or injured in ordinary service, etc.

In order that those acquainted with or skilled in this art may have a full and complete understanding of the invention and the several benefits and advantages accruing from its employment, a present preferred embodiment thereof has been illustrated in the accompanying drawing, forming a part of this specification, and to which reference should be had in connection with the following detailed description of the appliance portrayed therein.

In this drawing, in which like parts in the views have been supplied with the same reference numerals—

Figure 1 is a perspective view of the novel mower as seen more or less from the front of the apparatus; and Figure 2 is a front elevation of the mower on a somewhat smaller scale and shows the device cutting on sloping ground in full lines and on level ground in dotted lines.

Referring to this drawing, it will be noted that the device includes a transverse, main supporting-bar 11 with vertically slotted, upturned ends 12, 12 which adjustably accommodate bolts 13, 13 on which are rotatably mounted the ground engaging carrying-wheels 14, 14.

Suitably fixedly secured in any approved manner on such cross-element 11 is a forwardly extended, practically horizontal, tube 15 at the rear end of which is fixed the lower portion of a handle-shank 16 in the top end of which is adjustably secured the stem of a handle 17 equipped with a pair of hand-grips 18, 18 by means of which the mower may be pushed forwardly and at the same time conveniently steered.

At the front end of tube 15 is an upright bearing-member 21, an integral horizontal shank 22 of which is telescoped with and rockingly mounted on the part 15 so that the bearing 21 is adapted to oscillate transversely of the mower in a substantially vertical plane.

This bearing 21 accommodates an upright rotary shaft 23, depicted only by dotted lines whose protruding upper end is fitted with a substantially horizontally, peripherally grooved pulley 24 rotated by its crossed-belt 25 power driven by a vertically disposed pulley 26 of an internal-combustion motor 27 also suitably mounted on the cross-bar 11.

The lower projecting end of shaft 23 has fixedly secured thereon the hub 28 of a rotary cutter or mowing bar 29 the opposite ends of which are shaped and sharpened as illustrated to perform the grass or weed cutting operation.

Protecting the rear half of the circular path of travel of the two sharpened ends of cutter-bar 29 and of slightly larger diameter than the length of such bar is a practically semi-circular guard-bar 31 which is supported by a split hub 32 vertically adjustably mounted on the exterior of bearing 21 and capable of being tightened manually in place in different heighth positions by a set-screw 33, this element 31 being supported from such member 32 by a plurality of downwardly sloping radial elements or bars 34, 35 and 36 welded to such element 31.

The forwardly extended, parallel, end portions of such approximately semi-circular protector-bar 31 rotatably carry a pair of relatively small, transversely registered, ground-engaging, rubber-tired wheels 37, 37 and the two supports 34 and 36 have adjustably mounted in apertures therethrough the screw-threaded, terminal sections of a virtually semi-circular fender rod 38 adjustably held in place on such members by nuts 39, 39.

This curved rod 38 located at a higher level than the cutter-bar 29 and positioned within the ends of such revolving shearing blade which performs the cutting action below such part 38 thus determines the degree of approach of the cutter-blade with relation to obstructions, such as trees, shrubs, etc.

From what precedes it will be understood that as the mower supported by the four wheels is pushed forwardly by the operator by means of the rearwardly extended handle the cutter-blades are revolving by reason of the described connecting mechanism by the internal-combustion engine, or by an electric-motor if that is preferred, the depth of the cut of the vegetation to be operated upon being determined by the vertical adjustment of the ground-wheels 14, 14 on the part 11 of the structure and also by the adjustment of the pair of smaller wheels on the bearing 21, but inasmuch as the terrain on which the carrying-wheels 37, 37 are traveling at any time as to slope of its surface may be more or less materially different from the shape of the ground surface on which the large wheels 14, 14 are traveling the cutting will occur to conform to the former condition of the ground because the smaller wheels will automatically follow the terrain and cause the cutting-blades to do likewise, as is clearly indicated in full lines in Figure 2.

Obviously, this is a distinct advantage in the mowing operation and so far as is known is a distinctly new feature in a mower of this general type.

Thus the operator of the mower secures an improved method and means for cutting the growth on all portions of the ground passed over by the mower, this being, so far as known, an outstanding novel feature of construction and operation which automatically changes the slope of the blades to conform to that of the ground on which they operate.

It is to be noted that the curved guard 31 always protects both blades of the cutting-bar when they are passing around their rear portion of travel because the guard is located outwardly beyond the ends of such blades and it is to be observed further that the degree of approach of the cutter-bar to any object along the front portion of its cutting action is adjustable because the front fender 38 may be enlarged or diminished in size by merely modifying the mountings of its ends in their supporting-means.

Those acquainted with this art will readily understand that the current invention is not necessarily limited and restricted to the precise details of structure set forth and that modifications thereof may be resorted to without departure from the heart and essence of the invention and without the loss of any of its material benefits and advantages.

For example, instead of having the bearing 21 rock on the tube 15 it could be rigid therewith provided the tube had a proper bearing, for instance, on the member 11.

I claim:

1. In a mower having a main body equipped with ground sustained carrying wheels, the combination of a handlebar mounted on said main body and located rearwardly thereof and by which the mower is manually propelled and also steered, a support mounted on said main body and projecting forwardly therefrom, a normally upright bearing mounted on said main body at the front portion of said support and by means of a horizontal bearing rotatable on a horizontal axis on the support, whereby said upright bearing may oscillate laterally of the direction of travel of the mower, a shaft rotatable on said upright bearing and movable therewith, a pulley fixed on the upper portion of said shaft, a motor on said main body, a pulley on and driven by said motor, an endless belt cooperating with said two pulleys to power rotate said shaft, a horizontal cutter bar mounted on and rotated by the lower portion of said shaft, a practically semicircular guard bar of larger radius than one-half the length of said cutter bar located in substantially the horizontal plane of the cutter bar and outside of and adjacent the path of travel of the outer end of the revolving cutter bar in the rear portion of the path thereof, a hub adjustable lengthwise on said upright bearing and arms connecting said hub to said guard bar and supporting the latter in position, supplemental carrying wheels mounted on the opposite ends of said guard bar transversely of the direction of travel of the mower, and a fender rod at a higher level than and in front of said cutter bar and mounted adjustably on rods supporting the guard bar, whereby the cutter bar through its rotatable mounting on the support may be automatically tilted by the contour of the terrain by said supplemental wheels to conform at least approximately to the transverse ground surface over which the mower is passing and the vegetation of which it is cutting.

2. The mower construction set forth in claim 1, in which the pulley on the motor is in a substantially vertical plane and the pulley on the top of the shaft is in a substantially horizontal plane and an endless crossed drive belt, whereby the removal of such belt from the horizontal pulley permits the entire separation of the cutting portion of the mower from the main body of the mower and its ground wheels and handlebar.

3. A mowing machine comprising a frame supported on ground wheels, a member projecting forwardly from the frame, and an upright bearing carried by the front end of said member, an upright shaft rotatable in said upright bearing, a substantially horizontal cutter bar on the lower end portion of the shaft, a hub carried by the upright bearing and adjustable along the same, arms extending from the hub and inclined downwardly, a substantially semi-circular cutter bar guard carried by the arms and located in substantially the same horizontal plane with the cutter bar, ground wheels carried by the guard, a fender bar for the cutter bar, said fender being carried by some of the arms and projecting forwardly therefrom in a plane above the plane of the cutter bar, and means for driving the shaft.

4. A mowing machine comprising a frame supported on ground wheels, a bar projecting forwardly from the frame, an upright bearing having a lateral tubular shank rotatably mounted upon the front end of said bar, an upright shaft mounted in said upright bearing, a substantially horizontal cutter bar on the lower end portion of the shaft, a hub carried by the upright bearing and adjustable along the same, arms extending from the hub and inclined downwardly, a substantially semi-circular cutter bar guard carried by the arms and located in substantially the same horizontal plane with the cutter bar, ground wheels carried by the guard, a fender bar for the cutter bar, said fender being carried by some of the arms and projecting forwardly therefrom in a plane above the plane of the cutter bar, and means for driving the shaft.

5. A mowing machine comprising a frame supported on ground wheels, a member projecting forwardly from the frame, and an upright bearing carried by the front end of said member, an upright shaft rotatable in said upright bearing, a substantially horizontal cutter bar on the lower end portion of the shaft, a hub carried by the upright bearing and adjustable along the same, arms extending from the hub and inclined downwardly, a substantially semi-circular cutter bar guard carried by the arms and located in substantially the same horizontal plane with the cutter bar, ground wheels carried by the guard, a U-shaped fender bar for the cutter bar above the plane thereof and having its ends carried by and endwise adjustable on certain of the arms, and means for driving the shaft.

FOSTER M. FORD.

REFERENCES CITED

The following references are of record in the file of this patent:

UNITED STATES PATENTS

| Number | Name | Date |
|---|---|---|
| 843,691 | McIntosh | Feb. 12, 1907 |
| 1,202,472 | Binford | Oct. 24, 1916 |
| 1,819,133 | Stegeman et al. | Aug. 18, 1931 |
| 1,823,215 | Seal | Sept. 15, 1931 |
| 1,947,117 | Stegeman et al. | Feb. 13, 1934 |
| 2,134,115 | Flammang | Oct. 25, 1938 |
| 2,194,617 | Scott | Mar. 26, 1940 |
| 2,302,472 | Power | Nov. 17, 1942 |
| 2,478,558 | Beranek et al. | Aug. 9, 1949 |